(12) United States Patent
Grajcar

(10) Patent No.: US 9,505,665 B2
(45) Date of Patent: Nov. 29, 2016

(54) METHOD OF FORMING FERTILIZER

(71) Applicant: Once Innovations, Inc., Plymouth, MN (US)

(72) Inventor: Zdenko Grajcar, Orono, MN (US)

(73) Assignee: Once Innovations, Inc., Plymouth, MN (US)

( * ) Notice: Subject to any disclaimer, the term of this patent is extended or adjusted under 35 U.S.C. 154(b) by 0 days.

(21) Appl. No.: 14/295,915

(22) Filed: Jun. 4, 2014

(65) Prior Publication Data

US 2014/0352379 A1   Dec. 4, 2014

Related U.S. Application Data

(60) Provisional application No. 61/830,719, filed on Jun. 4, 2013.

(51) Int. Cl.
   *C05F 3/00* (2006.01)
   *C05F 17/00* (2006.01)

(52) U.S. Cl.
   CPC ............ *C05F 3/00* (2013.01); *C05F 17/0018* (2013.01); *C05F 17/0045* (2013.01); *Y02P 20/145* (2015.11); *Y02W 30/43* (2015.05)

(58) Field of Classification Search
   None
   See application file for complete search history.

(56) References Cited

U.S. PATENT DOCUMENTS

| 6,159,262 A  * | 12/2000 | Tumbers ............................. 71/7 |
| 8,790,436 B2 * | 7/2014 | Ersek et al. ........................ 71/6 |
| 2014/0338411 A1* | 11/2014 | Nunn ........................ C05F 3/06 71/9 |

FOREIGN PATENT DOCUMENTS

| EP | 0474992 | * | 3/1992 |
| EP | 0995350 | * | 4/2000 |

* cited by examiner

*Primary Examiner* — Wayne Langel
(74) *Attorney, Agent, or Firm* — Schwegman Lundberg & Woessner, P.A.

(57) ABSTRACT

A system and method of forming high nutritional fertilizer form swine feces in a reservoir underneath a swine facility. A pump system has a pump that conveys the feces to a remote location where the swine feces first goes through a filter and then into a treatment tank. The treatment tank has sugars or carbohydrates therein that combine with oxygen provided by a aerating device within the treatment tank and ammonia produced by the swine feces to create byproducts, including proteins having high nutritional value that is used for fertilizing plants and animals.

6 Claims, 2 Drawing Sheets

METHOD OF FORMING FERTILIZER

CROSS-REFERENCE TO RELATED APPLICATIONS

This application claims the benefit of priority to U.S. Provisional Patent Application entitled "Method of Forming High Nutrition Fertilizer," Ser. No. 61/830,719, which was filed by Z. Grajcar on Jun. 4, 2013, the entire contents of each of which are incorporated herein by reference.

BACKGROUND

This invention relates to a method of forming high nutrition fertilizer. More specifically this invention relates to using aerators in hog and swine barns in combination with sugars to convert hog and swine feces into reusable high protein material and reduce odor.

Hog confinement facilities for years have been used to raise hogs, swine, pigs and the like (hereinafter collectively as "swine"). Typically these facilities are a dwelling such as a barn that has a plurality of stalls or pens for receiving the swine. The floor of these facilities are typically elongated slats having spaces therebetween. After swine deprecate, they will frequently step on and roll on their own feces, often as a way of cooling themselves. Thus, by having a plurality of slats with openings therebetween the feces are pushed underneath the facilities into a reservoir of feces.

A main problem swine farmers have is what to do with the swine feces in the reservoir. The feces not only produce a very pungent odor that can be considered a nuisance to neighboring farms and in the community, but finding workers that will handle the feces can be difficult. In addition a byproduct of swine feces is ammonia that is both harmful to the environment provides a pungent odor. Thus a need in the art exists not only to eliminate odor from the waste, but in addition make the waste useful instead of harmful.

BRIEF SUMMARY OF THE INVENTION

A method of forming high nutritional fertilizer from swine feces that is collected from the reservoir located below a swine facility. An aerator is provided within the reservoir that operates to direct excess oxygen toward the swine feces within the reservoir. Simultaneously sugar, such as fructose, sucrose, molasses, orange molasses or the like is introduced into the reservoir. The sugar and oxygen combine with the ammonia created by the swine feces to form multiple byproducts, including a protein that has high concentrations of nutrients that can be used as fertilizer for plants or animals, including the swine.

Thus a principle object of the present invention is to provide a method of converting harmful ammonia into high nutrition protein;

Yet another object of the present invention is to eliminate odor from swine feces at a swine facility;

These and other objects, features, and advantages will become apparent from the rest of the specification and claims.

DETAILED DESCRIPTION OF A PREFERRED EMBODIMENT OF THE INVENTION

Figure 1:
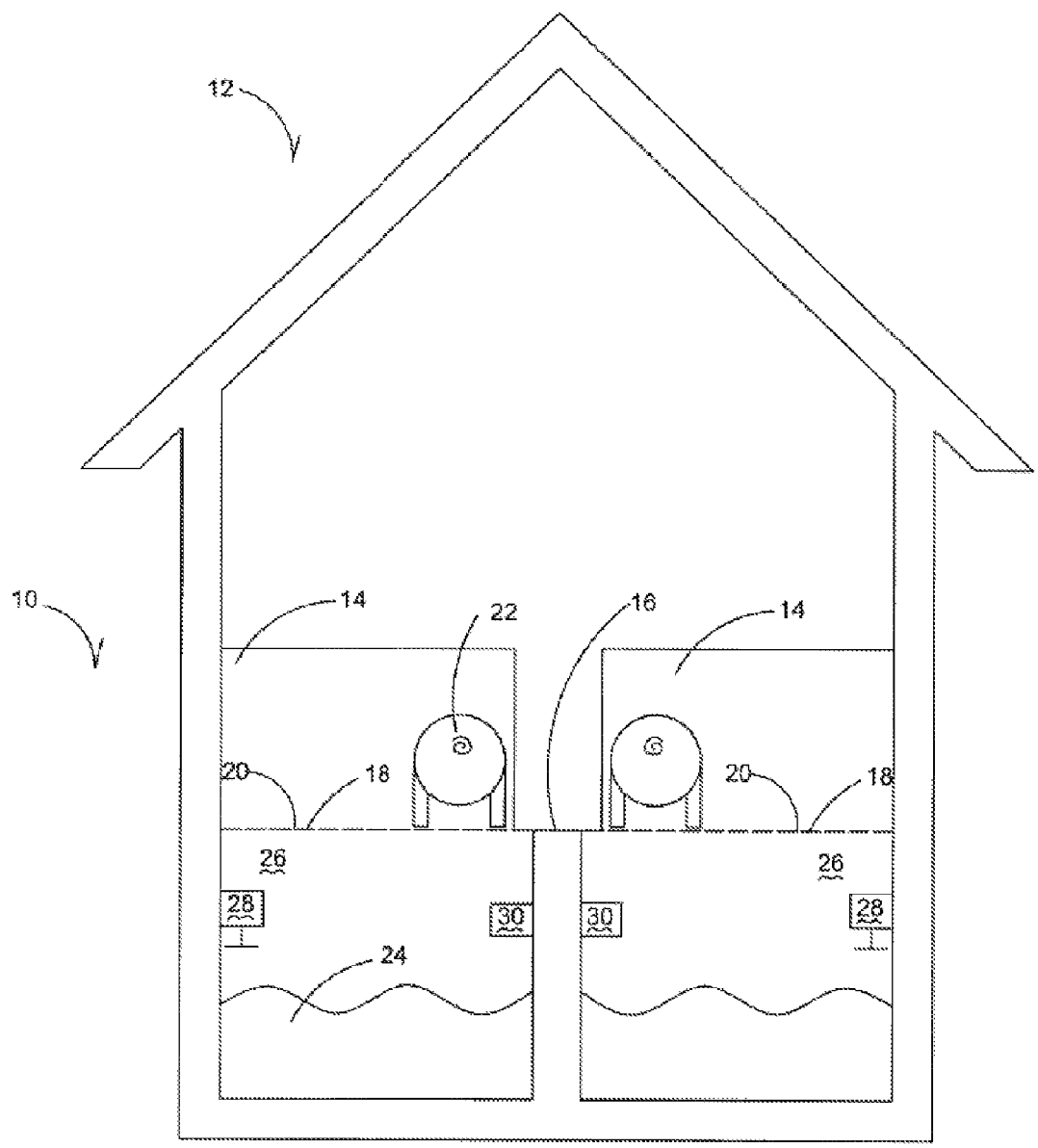
FIG. 1 is a side plan view of a swine waste treatment system.
Figure 2:
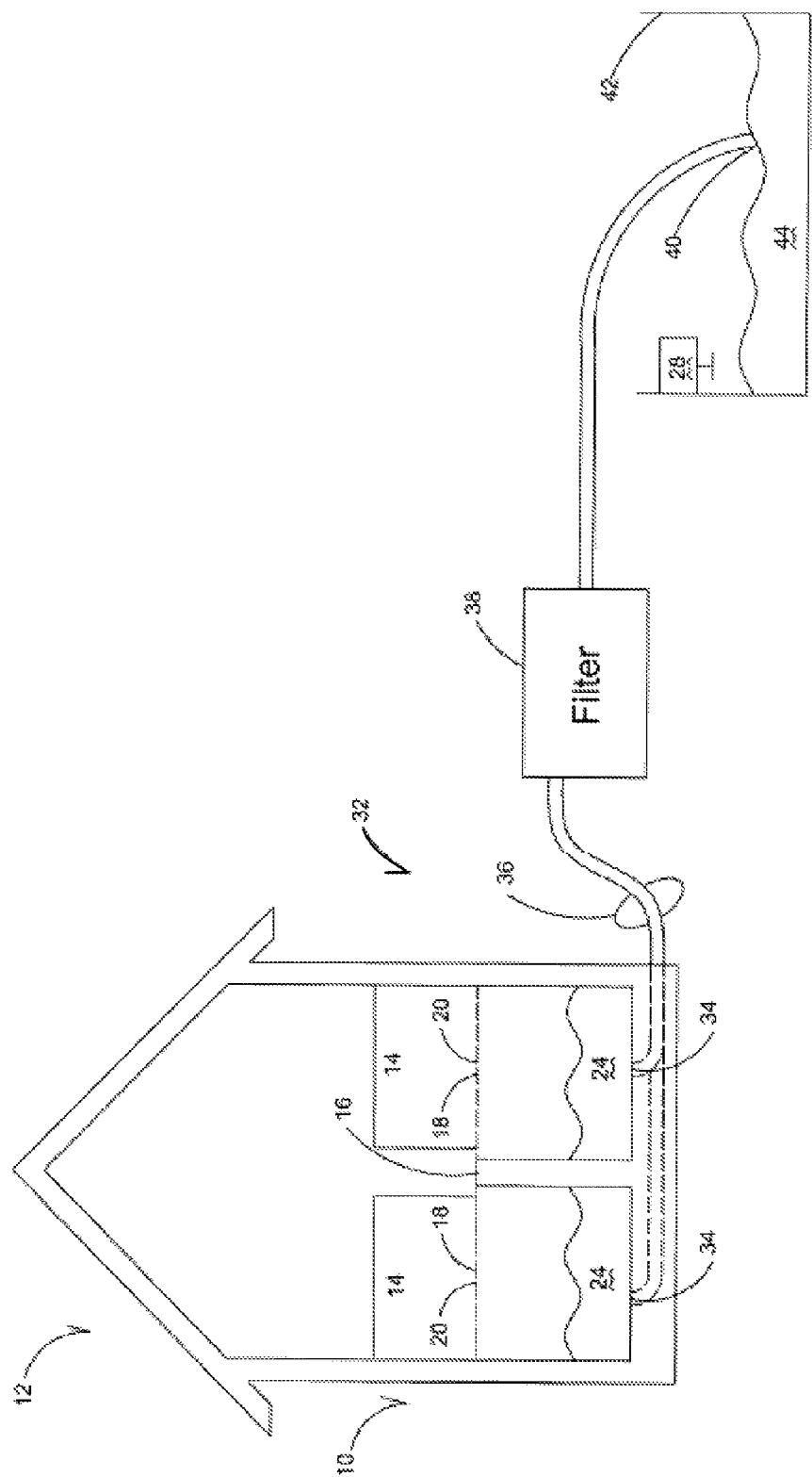
FIG. 2 is a side plan view of an alternative embodiment of a swine waste treatment system with a pump system.

The figures show a swine waste treatment system 10 that is located within a dwelling 12 such as a barn or hog containment facility. The dwelling 12 has a plurality of containment units 14 such as pens, stalls and the like. The floor 16 of the containment units 14 consist of a plurality of slat elements 18 that sit in paralleled spaced relation to one another to form a plurality of openings 20 between consecutive slat elements 18. In one embodiment the slat elements 18 are angled or slanted with one end higher than the other to cause a downward slope toward an opening 20 in the floor 16. In this manner when a swine 22 steps on or rolls on feces 24 the feces is pushed through the openings 20 below the floor 16. Similarly, during wash down of the containment units 16 the feces is power sprayed and the water and feces go through the openings 20 beneath the floor and into a reservoir 26.

The reservoir 26 is located underneath the floor 16 and holds the feces 24 that produces copious amounts of ammonia $NH_3$ in the air creating the undesired odor. Within the reservoir 26 is at least one aerating device 28 that moves air to present excess amounts of oxygen or $O_2$ within the reservoir 26. At the same time sugars such as fructose or glucose are added through the openings 20 or automatically by a sugar adding device 30. In one embodiment the sugars are within molasses and preferably orange molasses with a chemical composition of $C_{12}H_{22}O_{11}$, which not only is representative of sucrose, but can also be considered a carbohydrate ($C_m$-$(H_2O)_n$). The $O_2$ acts as an accelerate to the sugar/carbohydrate thus converting the harmful undesirable ammonia $NH_3$, nitrides ($N_3$-) and nitrates ($NO_3$) into water, carbon dioxide, very nutritional high value proteins (COOH—R—$NH_2$) that can be used as fertilizer for plant life or even food for livestock and $NH_4$ ammonium. As a result of the conversion of the ammonia into high nutritional protein and non-harmful ammonium the harmful ammonia is eliminated, also thus eliminating the undesirable odor. While fructose, glucose, molasses and sucrose have been discussed, other sugars or carbohydrates that present additional carbon and hydrogen (CH) into the reservoir 26 may be utilized without falling outside the scope of this disclosure.

In an alternative embodiment a pump system 32 having an inlet 34 within the reservoir 26 is provided. A pumping device 36 conveys feces 24 in the reservoir 26 from the inlet 34 to a filtering device 38 that catches or filters solid wastes before the feces 24 is conveyed to an outlet 40 within a treatment tank 42. The treatment tank 42 is filled with sugars, carbohydrates, molasses, orange molasses or the like 44 and has at least one aerating device 28 to present excess amounts of $O_2$. As the feces 24 is added into the treatment tank 42, again the sugars 44 and excess $O_2$ combine with the feces 24 to form nutritional proteins and other non-harmful byproducts that eliminate ammonium and thus pungent odor. The nutritional proteins may then be reused as fertilizer or feed.

Thus provided is a treatment system 10 that reduces and eliminates undesired odor within a dwelling 12 such as a swine containment facility. Feces 24 in such dwellings is converted into harmless byproducts such as water and useful byproducts such as high nutritional proteins for reuse. Thus at the very least all of the stated problems within the background are overcome.

What is claimed:

1. A method of forming high nutritional fertilizer steps comprising:

providing an aerating device within a reservoir of containing swine feces;

directing oxygen into the feces with the aerating device;

adding a sugar into the feces simultaneously with the oxygen to convert ammonia into proteins to be used as high nutritional fertilizer.

2. The method of claim 1 wherein the sugar is fructose.

3. The method of claim 1 wherein the sugar is glucose.

4. The method of claim 1 wherein the sugar is molasses.

5. The method of claim 1 wherein the sugar has a chemical composition of C12H22O11.

6. A method of forming high nutritional fertilizer steps comprising:

providing a reservoir containing swine feces;

pumping the swine feces from the reservoir with a pump system to a filtering device;

conveying the swine feces to a treatment tank having sugar therein;

providing an aerating device within the treatment tank; and conveying oxygen to the swine feces with the aerating device as the swine feces combines with the sugar within treatment tank to form high nutritional fertilizer.

\* \* \* \* \*